Sept. 17, 1929.  H. W. KRINER  1,728,568
GASOLINE PURIFIER
Filed Feb. 6, 1929
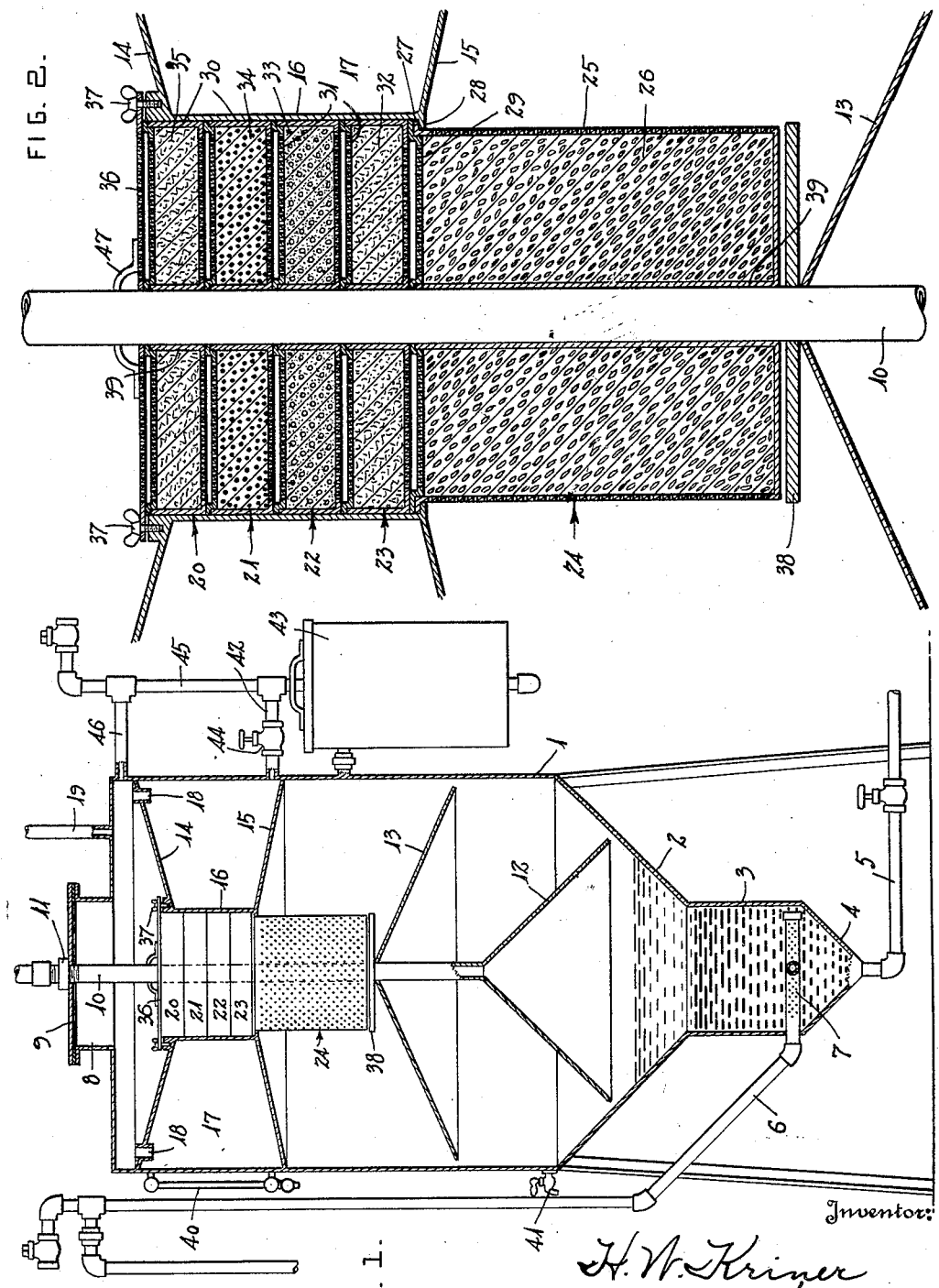
Inventor:
H. W. Kriner
By Monroe C. Miller
Attorney.

Patented Sept. 17, 1929

1,728,568

UNITED STATES PATENT OFFICE

HERMAN WILLIAM KRINER, OF GREENSBORO, NORTH CAROLINA

GASOLINE PURIFIER

Application filed February 6, 1929. Serial No. 337,960.

The present invention relates to apparatus for purifying gasoline and other solvents and aims to provide a novel and improved apparatus requiring only a small amount of storage, and which is economical in use on account of the rapid cleaning of the solvent.

It is also an object of the invention to provide a purifier of the kind indicated having novel features of construction to increase the efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a vertical section of the apparatus, portions being shown in elevation.

Fig. 2 is an enlarged vertical section of the filter elements.

The apparatus comprises a tank 1 which, as shown, is cylindrical with its axis vertical, and said tank has a lower funnel portion 2 with a depending bowl 3 having the funnel bottom 4 to which a drain pipe 5 is connected for discharging the sediment periodically.

The gasoline or other solvent is delivered through the pipe 6 into and from a perforated agitator pipe or head 7 within the bowl 3 which is filled with caustic soda and a substance known in the trade as "Darco", or similar material. The lower portion of the tank contains water to a level above the bowl 3, as seen in Fig. 1, in order to rinse or wash the solvent as it rises from the bowl 3.

The top of the tank has a neck 8 normally closed by a cover 9, and a central vertical vent pipe 10 extends through said cover. A collar or nut 11 is threaded on said pipe and bears on the cover to support the pipe.

The pipe 10 has a hollow cone 12 at its lower end, with the lower edge of the cone spaced slightly from the funnel portion 2 of the tank, so that the gasoline or solvent rising in the cone 12 is compelled to flow down around or across the edge of the cone 12, while air may pass out through the pipe 10.

A second cone 13 is secured on the pipe 10 above the cone 12 and its edge extends close to the wall of the tank 1, so that the solvent which rises from the cone 12 under the cone 13 is compelled to flow outwardly to pass upwardly across the edge of the cone 13. The cones 12 and 13 serve as baffles in the path of the solvent as it flows upwardly in the tank.

Annular partitions 14 and 15 are secured to the wall of the tank within the upper portion of the tank, and have secured to their inner edges a cylindrical partition or wall 16, thereby providing an annular chamber 17 for receiving the purified solvent.

The lower partition 15 is cone shaped, and the upper partition 14 is of inverted cone shape, and has near its outer edge the inlet ports 18 so that the solvent above the partition 14 may overflow through the ports 18 into the chamber 17.

A vent pipe 19 rises from the top of the tank 1 for the escape of air.

Superposed filter elements or units 20, 21, 22, 23 and 24 are provided for filtering the solvent as it rises from the cone 13, the elements 20, 21, 22 and 23 being located within the partition 16, while the filter element 24 is located between the partition 16 and cone 13.

The filter element 24 comprises a deep receptacle 25 having a perforated wall, and containing a filling 26 of cottonseed hulls. The receptacle 25 has an outturned flange 27 at its rim to seat on an inwardly extending flange 28 at the lower end of the partition 16. The receptacle 25 has a perforated cover 29.

Each of the filter elements or units 20, 21, 22 and 23 comprises a pan 30 having a perforated bottom, and a perforated cover 31. The element 23 has a filling 32 of felt; the element 22 has a filling 33 of sand and gravel; the element 21 has a filling of sawdust; and the element 20 has a filling 35 of felt, thereby providing superposed layers of different filtering materials.

A perforated plate 36 seats on the upper element 20 and is secured on the partition 14 by screws 37 or other securing elements, thereby clamping the elements 20, 21, 22 and 23 together on the element 24.

A horizontal plate 38 is secured on the pipe 10 above the cone 13 for lifting the element 24 when the pipe 10 is raised, so that the filter elements may be lifted upwardly through the neck 8 when the cover 9 is removed, for cleaning or replacing the filter material from time to time. The element 24 may also normally seat on the plate 38.

Each of the pans 30 and the receptacle 25 has a tube 39 rising from the bottom thereof to slip on the pipe 10.

A sight gage 40 is connected to the tank 1 for indicating the level of the solvent in the chamber 17, and should the gage fail to show any solvent in said chamber, the attendant is warned that one or more of the filters has become clogged, so that same should be removed and cleaned or replaced.

A drain cock 41 is attached to the wall of the tank 1 immediately above the portion 2 for draining solvent from the tank.

A pipe 42 leads from the lower portion of the chamber 17 to an exterior filter 43 for filtering the solvent as it leaves the chamber 17, and the pipe 42 has a hand valve 44. A pipe 45 leads upwardly from the filter 43 and an overflow pipe 46 connects the pipe 45 with the tank 1 above the partition 14.

The dirty solvent is delivered through the pipe 6 and agitator pipe 7 and passes upwardly through the caustic soda or similar material in the bowl 3 and then upwardly through the water to rinse or wash the solvent. The solvent then passes upwardly into the cone 12 and around the lower edge thereof, and then rises under the cone 13 and passes across the edge of said cone. The solvent then flows through the wall of the element 24 and filling 26, and upwardly through the layers 32, 33, 34 and 35 of filtering material, to thoroughly filter the solvent and arrest all foreign matter.

The solvent level rises above the filter element 20 and when it reaches the level of the upper ends of the ports 18, the solvent overflows through said ports into the chamber 17, from which it is drawn by opening the valve 44. The filter 43 is provided to assure against any dampness of the solvent, and from the filter 43 the solvent passes to the washers (not shown).

The filter elements 20, 21, 22, 23 and 24 may be secured together in any suitable manner and to the plate 36, to be lifted as a group from the tank, the plate 36 having handles 47 for lifting the filter units from the tank through the neck 8.

The present apparatus is capable of rapidly purifying the solvent, and with a tank having a capacity of 300 gallons, the apparatus is capable of purifying double that amount of solvent per hour.

Having thus described the invention, what is claimed as new is:

1. A solvent purifier comprising a tank having a lower inlet and an annular chamber, and a filter within the tank and surrounded by said chamber, said chamber having an upper port for the overflow of the solvent into said chamber after passing upwardly through the filter.

2. A solvent purifier comprising a tank having a lower solvent inlet, an annular chamber within the tank, a filter within the tank and surrounded by said chamber, said chamber having an upper port for the overflow of the solvent into said chamber after passing upwardly through the filter, a vertical vent pipe extending through the filter, and cones on said pipe below the filter.

3. A solvent purifier comprising a tank having a lower solvent inlet, a filter within the tank, and an annular chamber within the tank surrounding said filter and having an upper port for the overflow of the solvent into said chamber after passing upwardly through the filter, the top of the tank having a removable cover to permit withdrawal of said filter.

4. A solvent purifier comprising a tank having a lower solvent inlet, an annular chamber in said tank, and superposed filter elements within the tank, partly surrounded by said chamber and partly below said chamber, said chamber having upper inlet ports for the overflow of the solvent into said chamber after passing upwardly through said filter elements.

5. A solvent purifier comprising a tank having a lower solvent inlet, an annular chamber in said tank, superposed filter elements within the tank, partly surrounded by said chamber and partly below said chamber, said chamber having upper inlet ports for the overflow of the solvent into said chamber after passing upwardly through said filter elements, a vent pipe extending upwardly through said filter elements, and cones carried by said pipe below said filter elements.

6. A solvent purifier comprising a tank having a lower solvent inlet, upper and lower partitions secured to the wall of the tank and a cylindrical partition secured to said partitions and forming therewith an annular chamber, superposed filter elements within said cylindrical partition, and a filter element assembled with the aforesaid filter elements and extending below the lower partition, the upper partition having an inlet port for said chamber for the overflow of solvent into said chamber after passing upwardly through said filter elements.

7. A solvent purifier comprising a tank having a lower solvent inlet, upper and lower partitions secured to the wall of the tank and a cylindrical partition secured to said partitions and forming therewith an annular chamber, superposed filter elements within said cylindrical partition, a filter element assembled with the aforesaid filter elements and extending below the lower partition, the upper partition having an inlet port for said chamber for the overflow of solvent into said chamber after passing upwardly through said filter elements, a vent pipe extending upwardly through said filter elements, cones on said pipe below the filter elements, a plate secured on said pipe below the last named filter element for supporting same, and means on the uppermost filter element for clamping said filter elements down.

8. A solvent purifier comprising a tank having a lower solvent inlet, a filter within the tank, and an annular chamber surrounding the filter and having an upper inlet for the overflow of solvent after passing upwardly through the filter.

9. A solvent purifier comprising a tank having a lower solvent inlet, a filter within the tank, an annular chamber surrounding the filter and having an upper inlet for the overflow of solvent after passing upwardly through the filter, and baffles below said filter.

In testimony whereof I hereunto affix my signature.

HERMAN WILLIAM KRINER.